United States Patent [19]

Weichman et al.

[11] Patent Number: 5,534,873
[45] Date of Patent: Jul. 9, 1996

[54] NEAR FIELD RCS TEST FACILITY AND TESTING METHOD

[75] Inventors: Alan R. Weichman, Chesterfield, Mo.; Barton G. Ferrell, Troy, Ill.; William G. Butters, Florissant, Mo.; Gregory Murden, Ballwin, Mo.; Phillip D. Alldredge, St. Charles, Mo.; L. Adam Latham; Mike J. Courtney, both of Florissant, Mo.; Paul J. Degroot, St. Louis, Mo.

[73] Assignee: McDonnell Douglas Corp., St. Louis, Mo.

[21] Appl. No.: 385,057

[22] Filed: Feb. 7, 1995

[51] Int. Cl.$^6$ ........................................ G01S 7/40
[52] U.S. Cl. .......................................... 342/165
[58] Field of Search .................... 342/4, 165, 166, 342/90, 192, 193

[56] References Cited

U.S. PATENT DOCUMENTS

| | | | |
|---|---|---|---|
| 3,273,150 | 9/1966 | Emerson | 342/4 |
| 3,842,418 | 10/1974 | Lorber | 342/192 |
| 4,901,080 | 2/1990 | McHenry | 342/4 |
| 5,075,681 | 12/1991 | Kartiala | 342/165 |
| 5,134,405 | 7/1992 | Ishihara et al. | 342/4 |
| 5,153,597 | 10/1992 | Hueber et al. | 342/192 |
| 5,227,801 | 7/1993 | Pierce | 342/192 |
| 5,262,781 | 11/1993 | Evans | 342/165 |
| 5,264,855 | 11/1993 | Lammers et al. | 342/165 |
| 5,281,972 | 1/1994 | Jain | 342/165 |

Primary Examiner—Michael J. Carone
Assistant Examiner—Theresa M. Wesson
Attorney, Agent, or Firm—Pillsbury Madison & Sutro

[57] ABSTRACT

A method for determining the far field radar signature of relatively large and complex objects, like a fighter aircraft, and the facility to provide the data for the method. The method includes reflecting different frequencies of near field radar energy off of an object while translating the object in a radial direction with respect to the radar so the resulting radar return includes a moving signal representative of the radar return of the object and a stationary return representative of environmental clutter. The environmental clutter and R^4 amplitude variations caused by signal strength variations due to the different overall reflection distances during translation are removed from the radar signal. Multipath reflections may also be removed. The resultant signal is transformed from a spherical wave to a cylindrical wave so that for objects having a major dimension that is presented to the radar with respect to a much smaller minor dimension at right angles thereto, the radar signature as determined by the method is almost identical to that obtainable at a far field radar range. In addition, the facility includes an electromagnetically shielded building, object translating devices with position feedback, object rotators, and a computer to perform the transformations.

19 Claims, 8 Drawing Sheets

NEAR FIELD RCS TEST FACILITY AND TESTING METHOD

BACKGROUND OF THE INVENTION

Broadband absolute radar signature measurements as well as image diagnostic analyses are necessary for developing and proving technology that minimizes the return of radar energy from military vehicles such as aircraft, missiles, ground vehicles and ships. Verification of the low observable performance of such vehicles is important, not only at production acceptance but also after depot level repair, flight line maintenance and battle damage repair.

Heretofore, verification of low observable performance after flight line maintenance and after battle damage repair has been performed by small, surface sensors, that only give an indication of the relative quality of the repair and do not provide verification of the overall low observable performance of the vehicle. The standard facilities for low observables research and development testing are either large outdoor test facilities or specially constructed indoor compact ranges. An outdoor range requires a large amount of controllable flat real estate, which must be remote from centers of population for security reasons and to avoid electromagnetic interference. The large size of an outdoor range is needed for the production of uncluttered far field conditions. That is, the target whose radar signature is to be determined, and the radar must be separated by several thousand feet so that the target illumination can be approximated by an uniform planar wave. Outdoor measurement facilities cost on the order of $80 million to construct. They also have the disadvantage that in many instances, the target under test must be mounted on a pylon in the open, which means that over flying satellites can acquire optical views of the target and can determine the radar frequencies at which the target is being tested. The only effective counter measure for such fly over satellites is to operate such ranges only when no foreign satellite is in view, which means a great deal of the available range time is wasted shielding the target from view.

Indoor compact ranges do not require the vast amount of real estate that outdoor ranges require. However, they require the fabrication and deployment of large parabolic reflectors to simulate the far field plane wave test conditions. The reflector and facility construction costs unfortunately expand exponentially with target size. Hence, indoor compact ranges are economic for testing small targets, but ranges that can test large targets up to about 40 feet, typically cost about $30 million or more. Indoor ranges have the advantage over outdoor ranges, however, that security is more easily maintained and they can be operated continuously 24 hours a day because their operations are shielded from spy satellites, and protected from weather.

However, there has been a need to provide an economic test facility capable of measuring the radar signature of large low observable targets as accurately as existing outdoor range and indoor compact range facilities, but with a total cost to implement in existing buildings of about a tenth of the cost for an outdoor range, or a comparable indoor compact range.

BRIEF DESCRIPTION OF THE INVENTION

In the present invention, an indoor near field test facility is constructed, which needs no collimated reflector or large real estate requirements, it usually being housed in pre-existing aircraft hangers. The near field test facility can be co-located with engineering and manufacturing facilities on a flight ramp, which allows quick and easy aircraft access when total aircraft radar returns are to be measured. Since such near field test facilities can be located adjacent other manufacturing, and research and development facilities, there are almost no logistics costs associated with operating them, especially as compared to remote desert environments normally used for far field outdoor ranges.

Generally, the present near field test facility designed for testing the total radar return of fighter type aircraft, requires a building about 150' long by 150' wide by 40' tall. The interior walls, floor and ceiling of the building are treated with radar absorbing material (RAM) to reduce radar reflection. To take advantage of the greatest spacing available in a rectangular building (along its longest diagonal), the target area is positioned in one corner of the building and one or more antennas of a broadband radar system are positioned in the opposite diagonal corner. The entire facility is electromagnetically shielded so that little, if any of the test signals generated within the building emit for detection. With such a facility, the distance between the test object and the antennas is approximately 80', as opposed to the several thousand feet required for outdoor test ranges. The present invention uses direct target illumination, which eliminates the need for expensive large parabolic reflectors as heretofore required in compact ranges. The present near field test facility makes use of a unique measurement technique and data processing algorithms to obtain low observable measurements with comparable accuracy to those obtained at far field and compact ranges.

Even though indoor facilities have controlled environments, that is, radar absorbing walls to reduce unwanted radar reflections, a specialized measurement technique is needed due to the inherent clutter that is characteristic of building interiors. This clutter, or mixture of signals from various reflectors within the building, can significantly distort and mask the radar signature measurement of low observable targets. In the present invention, the clutter induced distortion is reduced by measuring the clutter and subtracting it from the signature measurement. The manner in which the clutter is measured is very important so that the target signature data is not distorted. The measurement technique involves acquiring data while the target and any target support are translating radially along the antenna line-of-sight. A Doppler process is then applied to the translation data set to separate the stationary signature from the moving signature. Since the target and target support are moving during data acquisition, the stationary signal is that of the clutter. At this point, the clutter has been determined and can be subtracted from the ensuing acquired data. The decluttered near field data is then transformed to the far field by using a transformational algorithm based on Fourier optics principles known as a Spherical Fourier Optics Transform. The algorithm is capable of transforming near field data to any other near field region up to and including the far field. Once the data has been transformed to the far field representation, other post processing tools can be used to evaluate the data. For low frequencies especially, an error in determining the stationary clutter signal can be generated by the changes in target return magnitude. This is because the measurement technique requires a target translation of at least one half wave length of the radar frequency under test. Therefore, for low frequencies the target must be translated further, which can result in a significant difference in amplitude of radar return from the target due to the increasing or decreasing distance between the target and the radar antennas. Since this difference in amplitude can be calculated with distance, its effect can be removed from the data. Multipath errors can also occur. They can be removed using measurements at different frequencies and at multiple fixed locations where the multipath contribution to the return can be estimated by performing a fast Fourier Transform (FFT) at each location and comparing the results.

Therefore, it is a principal object of the present invention to provide means for testing low observable targets in reasonably sized, existing hanger facilities.

Another object to provide a facility in which large low observable targets can be tested for radar signature in a secure environment.

Another object is to eliminate the expense, bother and unpleasant circumstances normally surrounding a visit to a desert far-field radar test facility.

These and other objects and advantages of the present invention will become apparent to those skilled in the art after considering the following detailed specification together with the accompanying drawings wherein:

DETAILED DESCRIPTION OF THE SHOWN EMBODIMENTS

Figure 1:
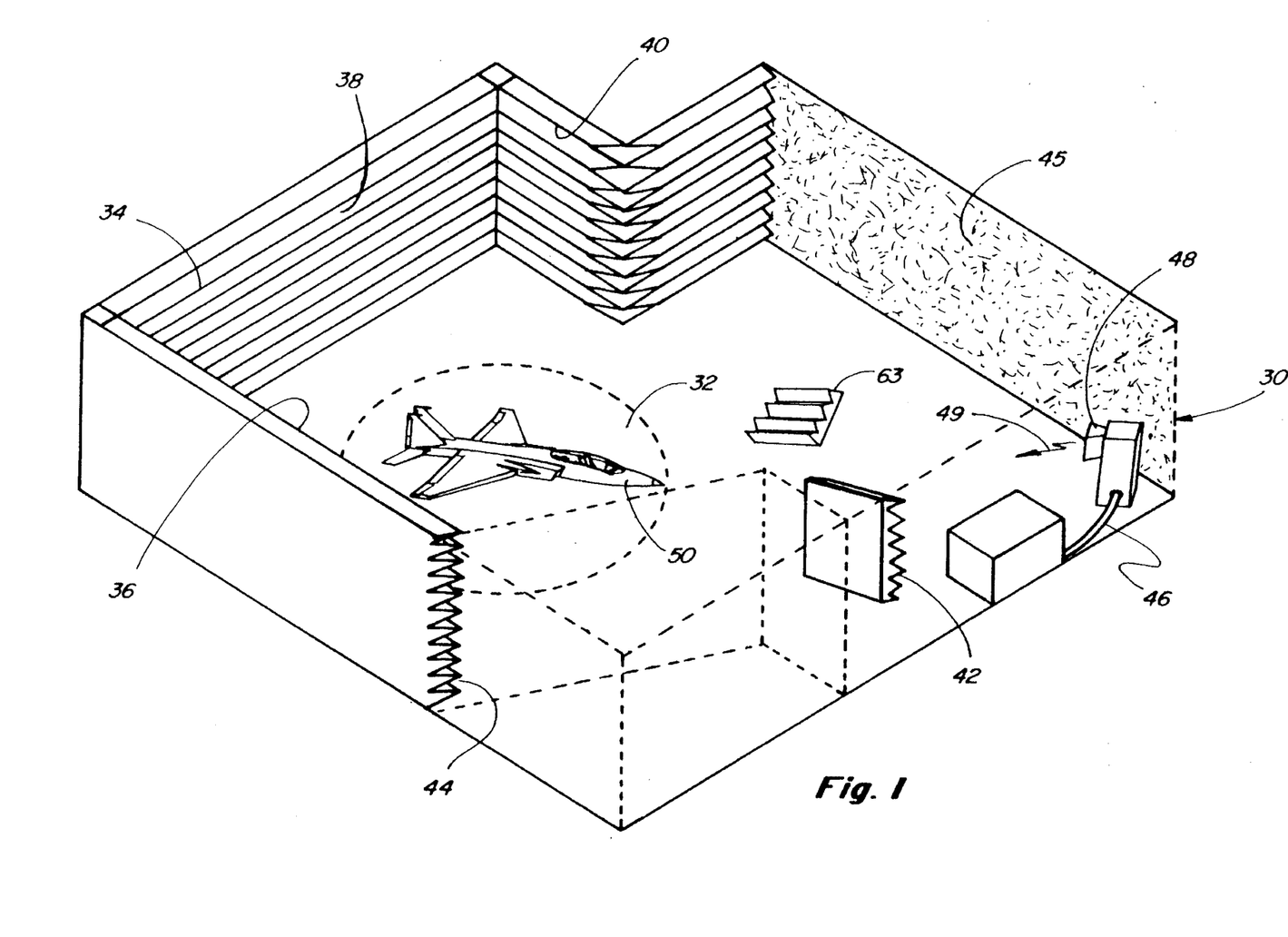
FIG. 1 is a perspective view of a typical near field test facility constructed according to the present invention.

Referring to the drawings more particularly by reference numbers, number 30 in FIG. 1 refers to a typical near field test facility constructed according to the present invention. The facility 30, which typically can be a modified aircraft hanger building, has a target area 32 in one diagonal corner 34 of the facility 30. As can be seen, walls 36 and 38 as well as other locations 40 and 42 are treated with radar absorbing materials (RAM) such as lossy foam wedges 44 or a radar absorbing coating 45. Generally it is desirable to provide a floor radar absorbing treatment that is robust enough to allow aircraft to be towed thereover. The corner at location 40 is undesirable, but such structures cannot always be avoided when existing buildings are converted into the facility 30. At the opposite diagonal corner 46, there is positioned a radar antenna 48 suitable to launch radar signals 49 at the frequencies to be tested. For testing full size combat fighter aircraft, a facility of approximately 150 feet by 150 feet is adequate. Even though such an indoor test facility 30 has a totally controlled radar reflective environment, a specialized measurement technique is needed due to the inherent clutter that is characteristic of existing hanger buildings. Such clutter can significantly distort the radar signature measurement of low observable targets. The clutter induced distortion is reduced by measuring the clutter and subtracting it from the signature measurement in a way that the target signature data is not distorted.

Figure 2:
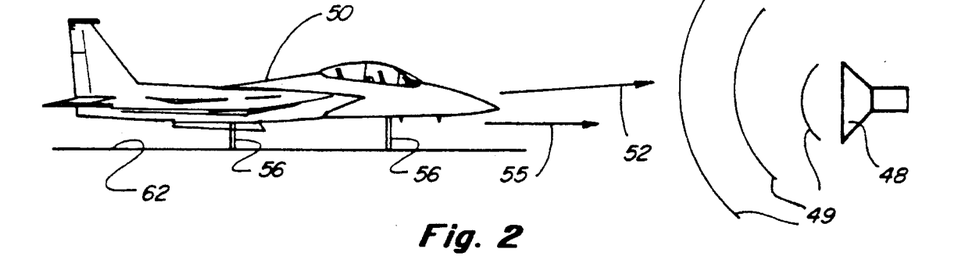
FIG. 2 is a side elevational view of the near field measurement system of FIG. 1.

The measurement technique involves acquiring data while the target, shown as fighter aircraft 50 in FIG. 2, is translating radially along the line-of-sight 52 of the antenna 48. A Least Squares Estimate process is then applied to the translation data to separate the stationary signature from the moving signature since the target 50 and target supports, which are shown consisting of air bearing aircraft jack stand platforms 54, are moved (in the direction of line-of-sight arrow 55) during data acquisition process. The stationary signature generally is that of the clutter. Once the clutter is known, it can be subtracted from the ensuing acquired data to determine the radar signature of the target 50. The decluttered near field data is then transformed to the far field using a transform algorithm based on optics principles known as Fourier Optics Transform. This algorithm is capable of transforming near field data to any other region up to and including the far field, the data that is most useful in determining what the radar return will be in a combat environment. Once the data has been transformed into the far field representation, other post processing tools including radar cross section (RCS) imaging can be used to evaluate the data.

An RCS image is a two dimensional map of a target's radar reflectivity. The ability to resolve or separate scattering centers in an RCS image depends primarily upon the frequency and angular bandwidth of the data set. One processing algorithm, which increases image fidelity, is called linear prediction extrapolation. This algorithm increases the effective frequency and angular bandwidth of a data set, thereby increasing the ability to isolate closely related scattering centers.

Another unique aspect of the measurement system is the target support system for use in measuring the RCS information of operational aircraft. The aircraft 50 is mounted on the aircraft jack stands 56 (FIG. 3) so the landing gear thereof can be fully retracted, as is normally the case when a combat aircraft is being subjected to radar interrogation. The jack stands 56 are positioned on the air bearing platforms 54, which when pressurized allow the aircraft jacks 56 and the aircraft 50 to float on a thin layer of air. This permits easy rotation of the aircraft 50 for measurements at various aspect angles by a rotator 58. It is desirable that such jack stands 56 be covered with shrouds 59 employing radar absorbing material (RAM) so that their radar signatures do not distort the aircraft's signature measurement. The rotator 58 and air bearing platforms 54 can translated on rails 60 mounted in a pit 61 below floor level to provide linear movement. The jack stands 56 also can be supported on a rotating platform if such is available. It is also desirable to treat the floor 62 of the facility 30 with radar absorbing material as well as the ceiling, not shown, to reduce the clutter measurements to a minimum. Although movable blocks of lossy foam wedges 63 can be placed on the floor 62, it is desirable that physically rugged RAM be used so that large objects, like the aircraft 50, can be wheeled in and out over the RAM.

Figure 3:
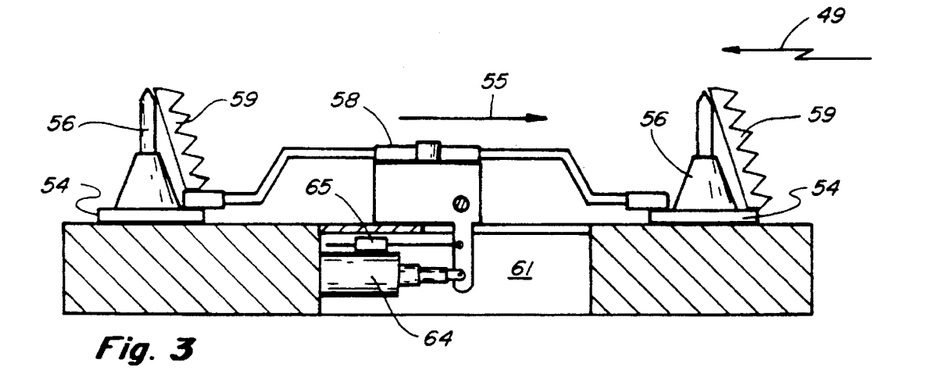
FIG. 3 is an enlarged elevational, cross-sectional view of a typical aircraft mounting system for the near field test system of FIG. 1.
Figure 4:
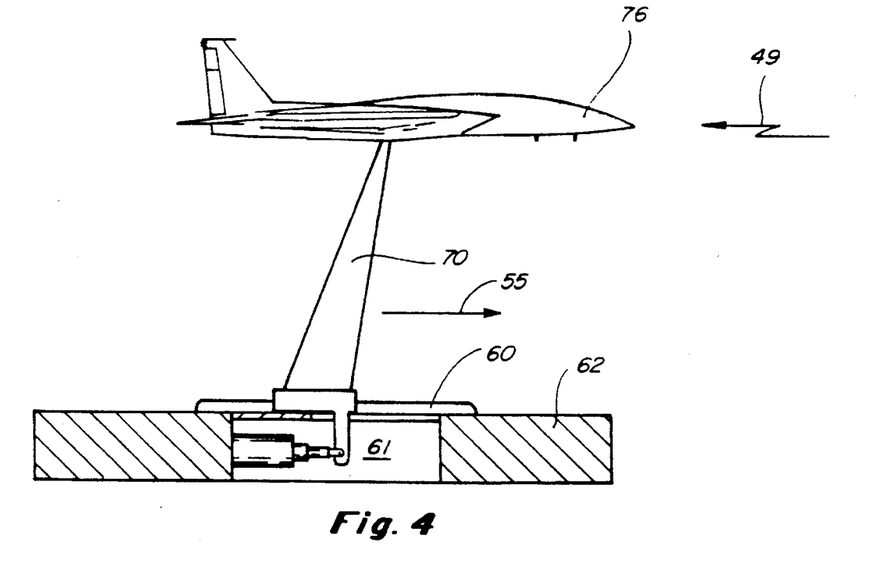
FIG. 4 is a side view of a pylon mounting configuration for the near field test system of FIG. 1.

The radial motion of the target 50 along the antenna's line-of-sight 55 can be powered by almost any controllable linear drive means that include positive feedback, so that an instantaneous measurement can be matched with the position of the object 50. In FIGS. 3 and 4, a hydraulic ram 64 with a position sensor 65 is shown connected to the rotator 58 to drive it and the object 50 along the line-of-sight 55.

Figure 5:
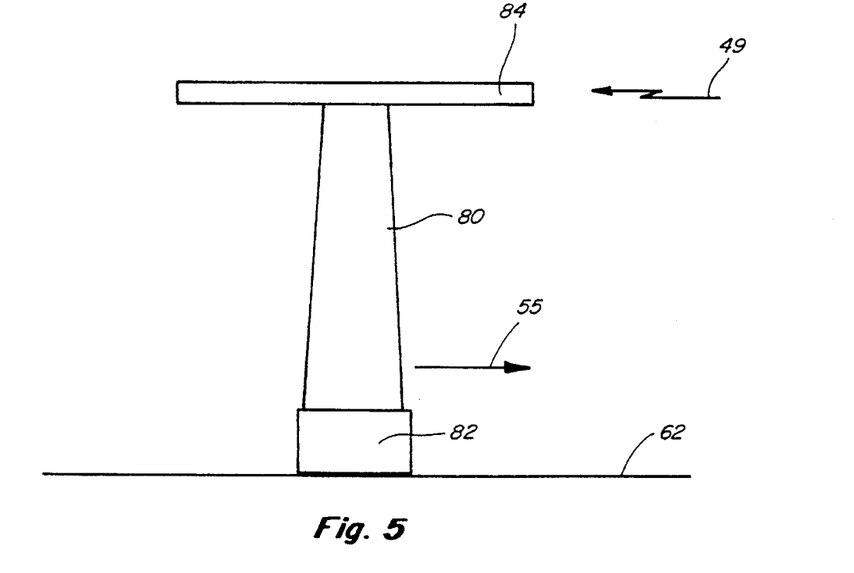
FIG. 5 is a side elevational view of a foam column mounting configuration for the near field test facility of FIG. 1.

The ability to adopt a variety of target mounts increases the facility's versatility. The facility 30 being described is capable of testing not only operational aircraft 50, but large scale models as well as smaller components. FIG. 4 shows a RAM treated pylon 70 that includes a rotator 72 at its upper end 74 for changing the aspect of the object (shown as drone 76) with respect to the radar signal 49. FIG. 5 shows a foam support column 80 and a rotator 82 supporting a test article 84.

The translation hardware shown in FIG. 3 not only can translate target 50 but can translate the standard pylons 70 and foam support structures 80 as illustrated in FIGS. 4 and 5.

The algorithm used to transform target signature data measured in the near field and the data representative of detection and further distances up to and including the far field is based upon the diffraction theory employed in Fourier Optics. The approach differs from many other transformational techniques since it requires no prior knowledge of target geometry and uses no exotic scanning techniques. The algorithm can be applied to multi-frequency data to yield absolute measurement patterns or with the application of two dimensional processing, image domain data.

For a conversion to the far field, the transformational approach is essentially to convert the near field spherical wave data to plane wave data, although by converting to cylindrical wave data whose axis is perpendicular to the minor dimension of the object being tested having a substantial difference in major and minor dimensions, little accuracy is lost and computational requirements are greatly reduced. Such a spherical to cylindrical transformation removes the near field effects in the azimuthal (major dimension) measurement plane. The algorithm is general for both horizontal and vertical directions so the RCS of objects having little difference in major and minor dimensions can be determined. Although a true far field wave is planar, the cylindrical wave approach is acceptable in most cases because the horizontal extent of most targets (major dimension) is usually much larger than the vertical extent (minor dimension) and thus will be more in the near field. To better understand the transformation, imagine that the spherical near field waves 49 in FIG. 2 (a vertical slice thereof being shown) are instead cylindrical waves whose axes extend perpendicular up out of the sheet.

The measurement technique used to remove clutter induced distortion in the target data is based on determining the stationary clutter from data acquired on a translating target. Once the clutter signature is obtained, it is subtracted from the acquired data, which results in the signature of the target under test.

Although the present method is described as being performed inside an electromagnetically sealed building, the method can be performed without an enclosure, or with an enclosure that shields the object under test from view, but is transparent to radar energy. When such is used, the radar is time gated so that any returns that are too late in time to have come from the object at its furthest away translation point, are disregarded. Because of the gating, only the immediate surroundings of the object need to be maintained stationary to have a subtractable stationary radar return.

The primary use for the facility 30 is to acquire broad band radar cross section measurements on full scale test vehicles, including operational aircraft. The basic invention even can be adapted for use in crowded areas such the hangar deck of aircraft carriers. However, some additional errors need to be removed so that the data acquired by such facility 30 can be equated with the far field data acquired at outdoor ranges.

Background subtraction is a signal processing technique to remove stationary clutter returns from RCS data. Several clutter rejection techniques, such as translational background subtraction, imaging gating and reconstruction, and Doppler filtering, can be used to estimate stationary clutter from measurements when the target is mounted on low observable fixtures and pylons in indoor facilities. Background subtraction can be very effective in reducing range and target support clutter. In controlled facilities, fixtures and pylons can be removed easily and precisely reinstalled and realigned to achieve high quality coherent subtraction. However, measuring very large models or operation aircraft makes such precise alignment impractical. In this latter case, clutter removal techniques must be capable of measuring the background with the target installed on its supports. The translational measurement technique accomplishes this result.

Figure 6:
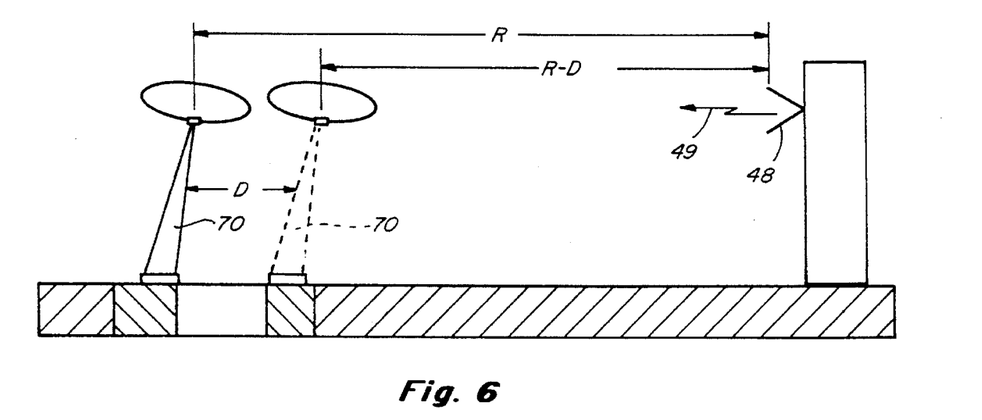
FIG. 6 is a diagrammatic view of a target translation system for the present invention.

FIG. 6 illustrates a typical translational measurements system set-up. The background measurement data is obtained by collecting frequency sweeps at discrete target locations while the mounted/configured target is translated linearly a distance D toward the radar antenna 48 at a fixed azimuth angle so that the distance changes from R to R-D.

Figure 7:
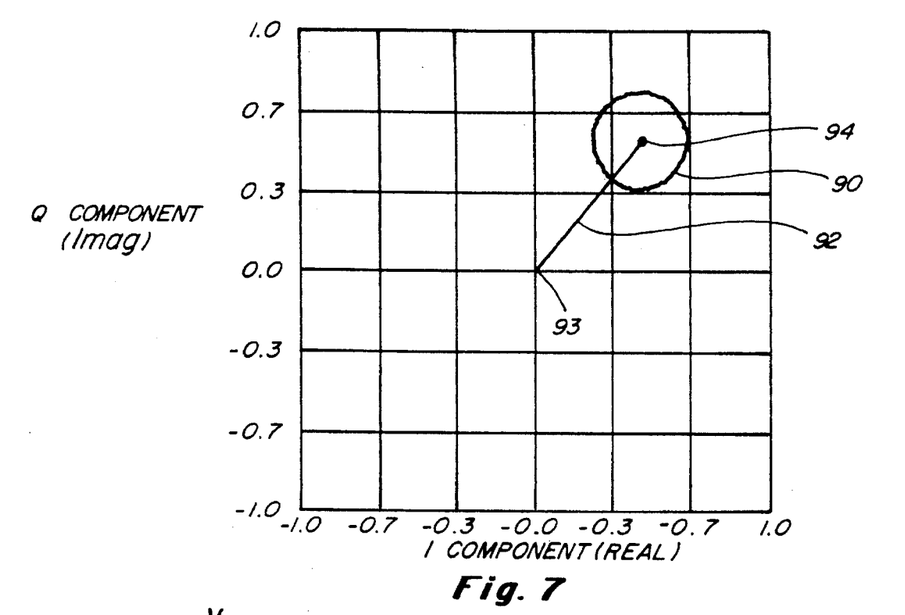
FIG. 7 is a an I/Q data plot of a simulated target translation.

FIG. 7 is a single frequency plot of simulated translational measurement data. The plot is the in-phase component (I) versus the quadrature component (Q) of the target back scatter at a single frequency as the target is translated linearly toward the radar antenna 48. As the target moves, the path length, R-D, and therefore the signal phase varies while the magnitude of the signal remains constant due to the fixed target aspect, especially when higher frequencies are being measured. When displayed in the I/Q domain, the constant magnitude varying phase signal forms a circle 90. The vector 92 that connects the origin 93 to the center 94 of the circle 90 is the stationary clutter vector. From this data, software algorithms are used to accurately estimate the stationary clutter vector at each measurement frequency, which are then subtracted from the measured signal to yield the RCS of the object.

Figure 8A:
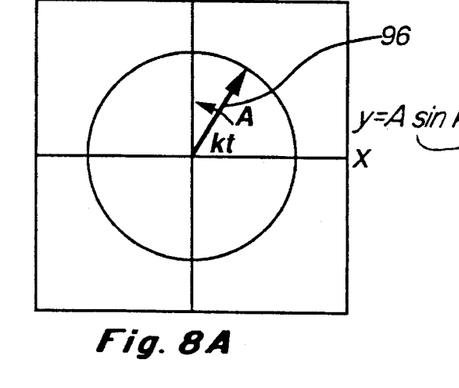
FIGS. 8A and 8B are a phasor diagram of a sinusoidal signal.
Figure 8B:
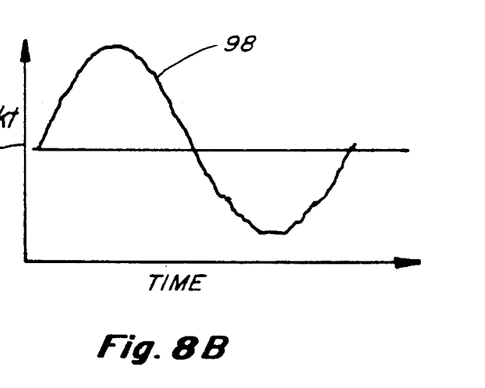
Figure 9A:
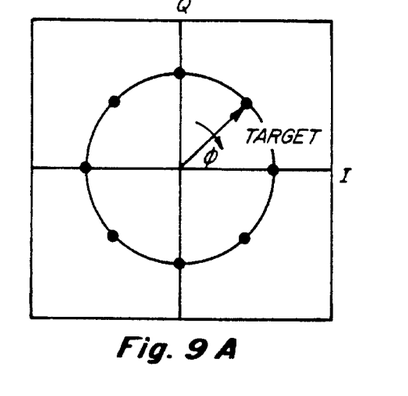
FIGS. 9A, 9B and 9C are a phasor diagram of a target translation data run.
Figure 9B:
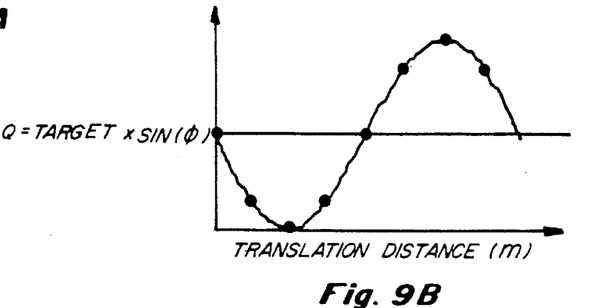
Figure 9C:
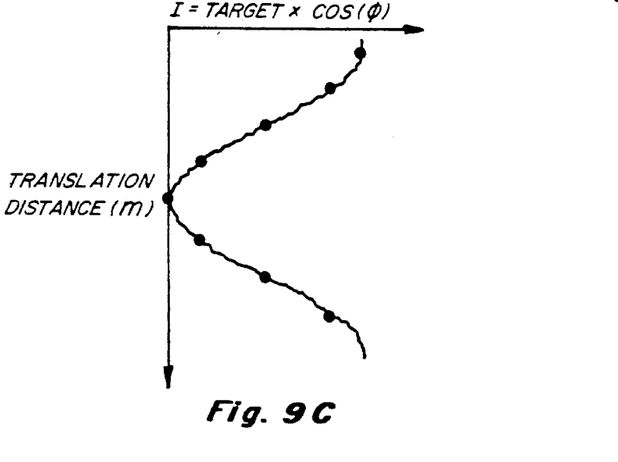

As shown in FIGS. 8A and 8B, a phasor 96, is a rotating vector that represents a sinusoidal signal 98. The translation measurement I/Q representation is analogous to the phasor diagram representation of real time signals. In this case however, the signal being modeled is the magnitude of the target back scatter at discrete target locations from the radar antenna 48. The rotation of the target vector 96 is dependent on the change in signal path length as the target is translated toward the antenna 48. For example, suppose the target translates D=0.0625 meters between measurement samples. At a measurement frequency of 300 MHz, the phase shift due to the change in path length equals frequency×2×D× 360/speed of light (300×10⁶×2×0.0625×360÷3×10⁸=45° per sample). Therefore, it would require the target be moved 0.5 meters (~½ wavelength at 300 MHz) to complete a full cycle of phase. This equation accounts for the two-way travel between the antenna 48 and the target. FIGS. 9A, 9B and 9C illustrate this vector rotation.

Figure 10:
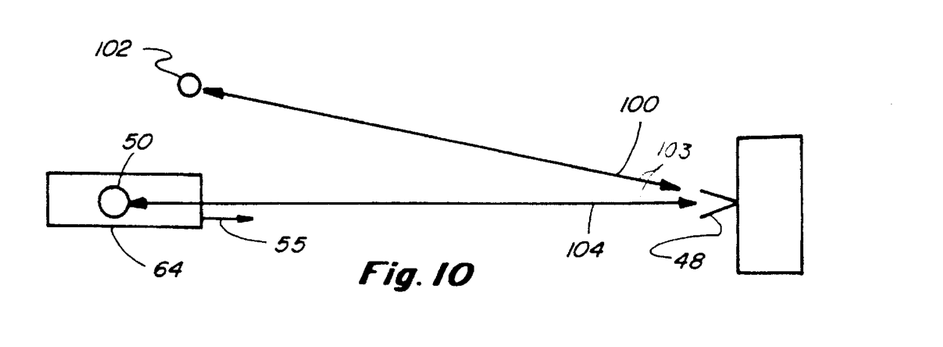
FIG. 10 is an illustration of a stationary clutter return.
Figure 11A:
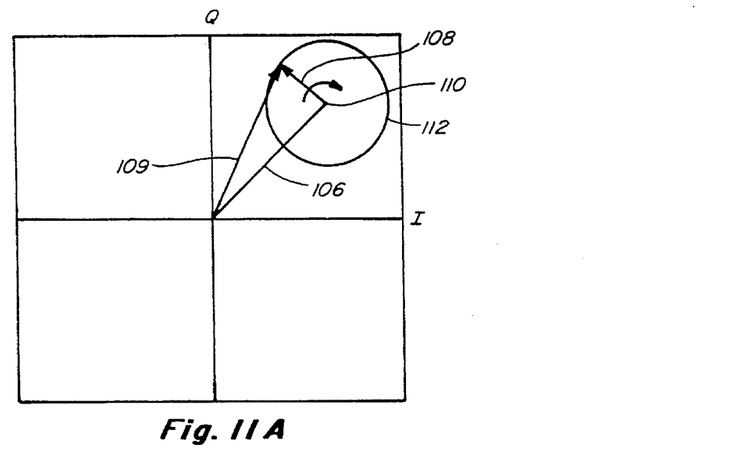
FIGS. 11A, 11B and 11C are a phasor diagram of a translation run with stationary clutter bias.
Figure 11B:
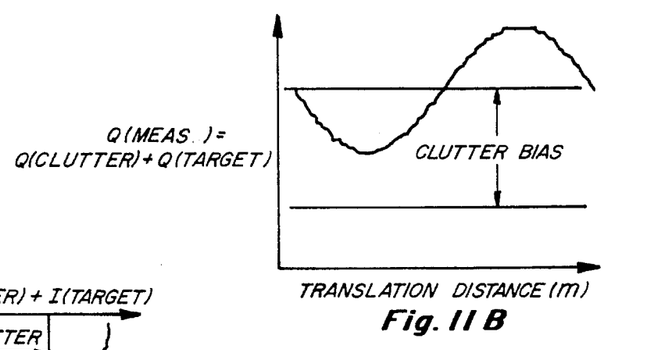
Figure 11C:
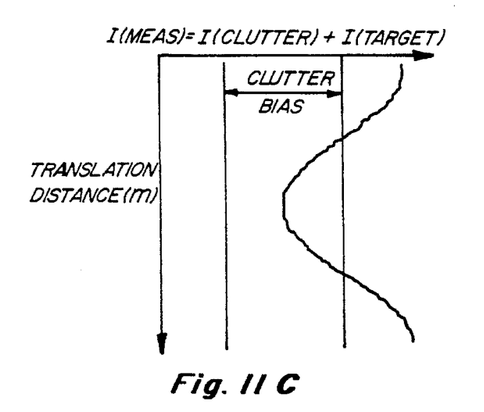

Stationary clutter caused by direct signal returns 100 from non-moving objects 102 are part of the measurement environment, as shown in FIG. 10. These signal returns 100 exhibit constant magnitude and phase characteristics because the signal path lengths from the antenna 48 to the clutter sources remain constant during the measurement. The measured composite RCS signal 103 consisting of the target signal 104 biased by the stationary clutter signal 100 is illustrated in FIGS. 11A, 11B and 11C. In the phasor diagram, the stationary clutter vector 106 is modeled as a single non-rotating vector that adds coherently to the target vector 108 resulting in the measured vector 109. The center 110 of the circle 112 formed by the rotating target vector 114 is the stationary clutter return 100. Several methods including data averaging and finding the best fit to the circle 112 can be used to calculate the coordinates of the center 110 of the circle 112, and thereby determine the clutter vector 106.

Since the translation measurement data is used to estimate the stationary clutter vector 106, the quality of the data determines the accuracy of the estimate. Multipath interactions and R^ 4 loss effects are two measurements errors that can bias the clutter estimate.

Figure 12:
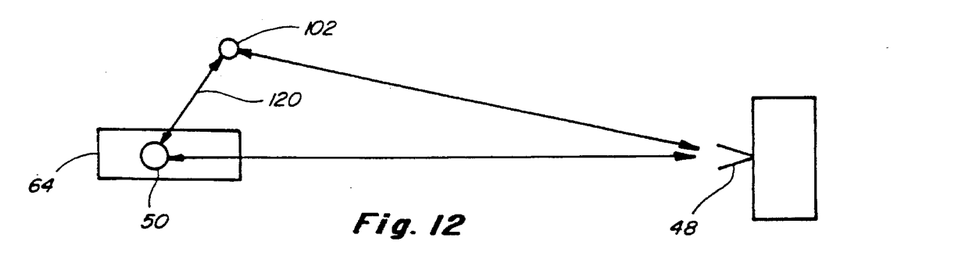
FIG. 12 is a diagram of multipath target/room interactions.
Figure 13:
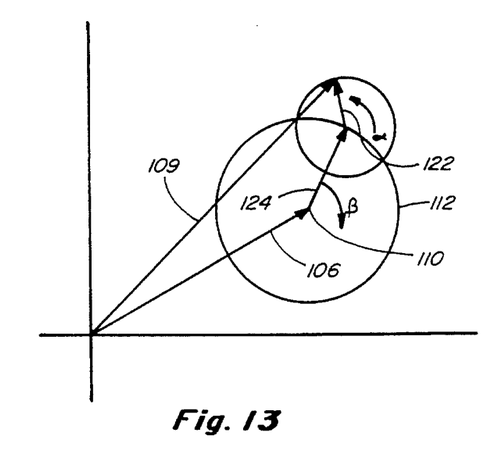
FIG. 13 is a phasor diagram/background/multipath.
Figure 14:
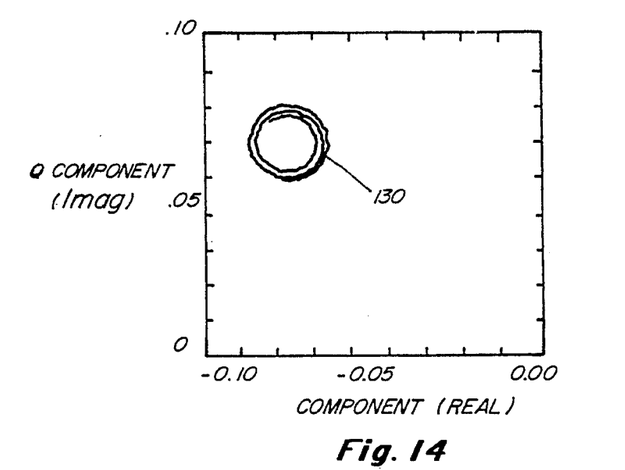
FIG. 14 is an I/Q plot of simulated translation data with multipath effects.

For ground based measurements, multipath clutter returns are a source of measurement error that corrupts RCS data. Multipath clutter is caused from non-target related scatterers 102 that interact with the moving target 50. FIG. 12 illustrates a multipath clutter signal 120. Two common types of multipath interactions at RCS ranges are target/range and target/pylon interactions. Unlike stationary clutter, multipath clutter signals 120 have changing amplitude and phase characteristics because the signal's path length changes as the target 50 translates. Consequently the signal 120 appears as a target return. FIG. 13 shows the phasor diagram representation of a translation measurement that includes a multipath signal return. Notice that the multipath signal vector 122 modulates on the target signal vector 124. The rate of the multipath vector rotation β is different than the rotation of the target vector because the path lengths of the two signals are different from one another. Consequently the corrupting multipath signal 120 causes the I/Q pattern 130 to be warped and disjointed as shown in FIG. 14. Therefore, estimation algorithms that rely on the trueness of the circle 112 to estimate the center 110 are subject to error. Several estimation techniques can be used to isolate the background vector from the translation data that contains multipath clutter. One technique is to Fourier transform the translation data and use the zero Doppler return as the stationary clutter estimate.

Figure 15A:
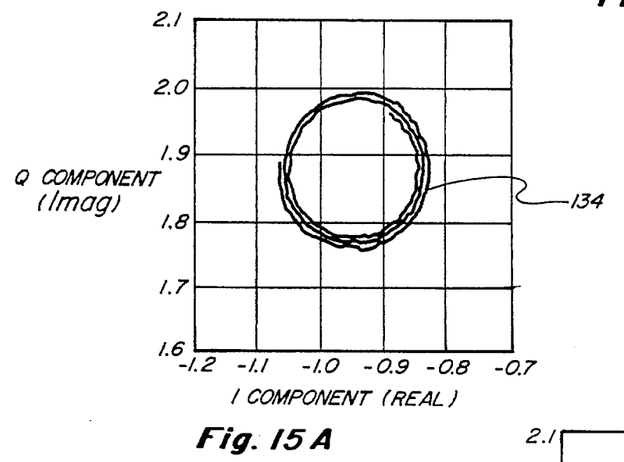
FIGS. 15A and 15B are an I/Q plot of simulated translation data with R^4 loss effects.
Figure 15B:
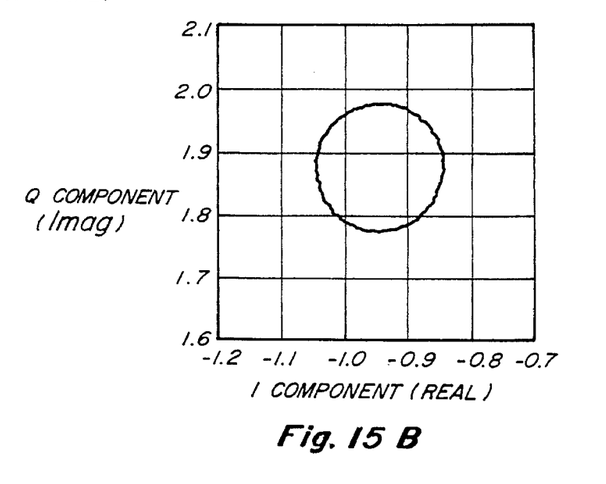

Another problem associated with the translation measurements is the R^ 4 loss effects that occur when the target 50 translates toward the antenna 48. These effects are most noticeable at long wavelengths because the required translation distance is proportional to the wavelength of the transmitted signal. FIG. 15A shows an I/Q plot 134 of simulated data which includes the R^ 4 space loss effects. Notice that the plot 134 spirals outward as the target translates toward the radar antenna, i.e., the target back scatter magnitude is greater when the target is closer to the antenna 48. By using a R^ 4 correction algorithm, to compensate for the measurement errors, the translation data spiral 134 can be corrected to the circle 136, as shown in FIG. 15B. The clutter vector can be more accurately calculated from this corrected data set.

Figure 16:
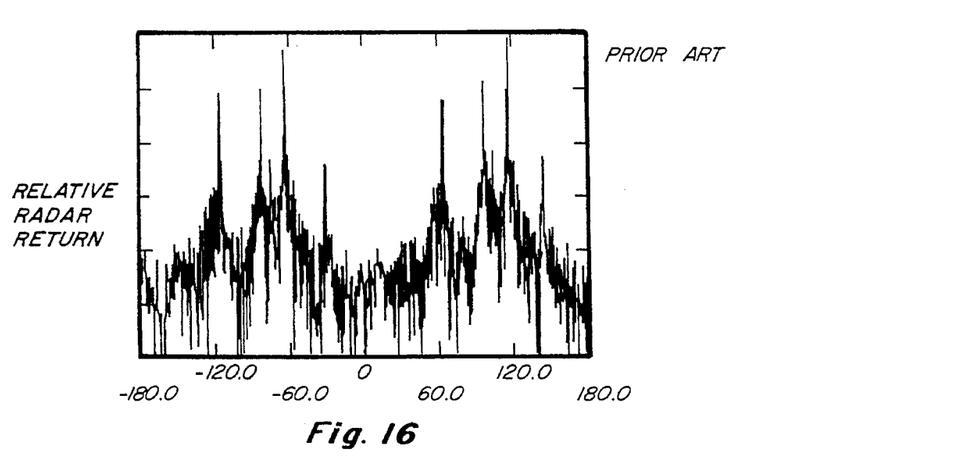
FIG. 16 is relative radar return over ±180° of azimuth of an object as measured at the McDonnell Douglas compact range, St. Louis, Mo.
Figure 17:
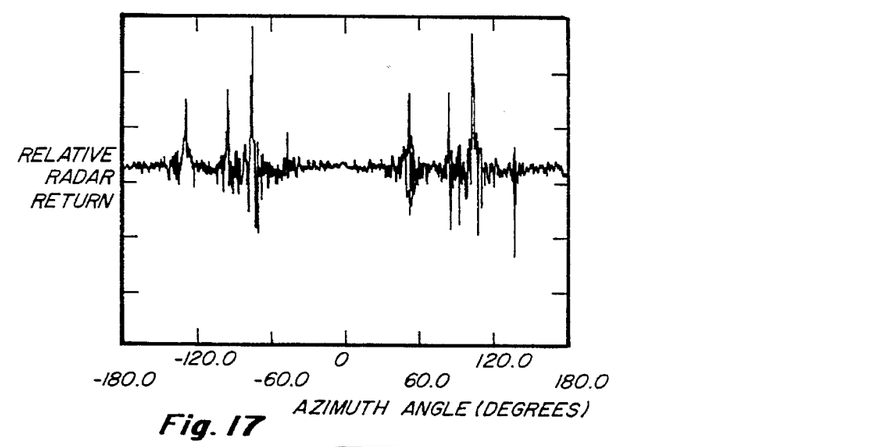
FIG. 17 is raw radar return over ±180° of azimuth of the object whose relative radar return is shown in FIG. 16, as measured at the McDonnell Douglas near field range, St. Louis, Mo.
Figure 18:
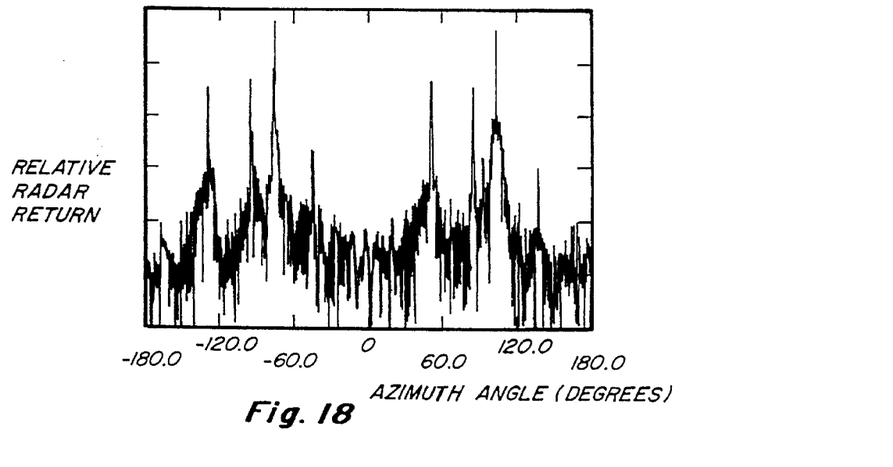
FIG. 18 is relative radar return over ±180° of azimuth of the object taken and processed in accordance with the present invention at the McDonnell Douglas near field range, St. Louis, Mo.

FIGS. 16 through 18 are comparisons of actual RCS performance as measured in the facility 30 versus the same RCS performance when the was measured at the McDonnell Douglas compact RCS range facility. Note that in FIG. 17, which is the raw data from the near field range 30, almost all useful data is masked by the radar return from the background, whereas the data from the compact range (FIG. 16) and the data collected and processed in accordance with the present invention in the near field range 30 (FIG. 18) are almost identical.

Therefore, there has been shown and described, a novel facility and method for measuring RCS without resort to a large outdoor range, which fulfill all of the objects and advantages sought therefor. Many changes, alterations, modifications and other uses and applications of the subject facility and method, will become apparent to those skilled in the art after considering this specification, together with the accompanying drawings. All such changes, alterations, and modifications which do not depart from the spirit and scope of the invention are deemed to be covered by the invention, which is limited only by the claims that follow.

We claim:

1. A method of determining the far field RCS with near field spherical radar return data of an object with a stationary background thereabout including:

(a) illuminating the object and stationary background with radar energy at a first wavelength, thereby causing stationary spherical radar energy to be reflected by the stationary background;

(b) translating the object along a radial line-of-sight of the radar energy a distance of at least one half the first wavelength, thereby causing moving spherical radar energy to be reflected by the object;

(c) detecting the moving spherical radar energy and the stationary spherical radar energy; and (d) separating the detected moving spherical radar energy from the detected stationary spherical radar energy.

2. The method of determining the far field RCS of an object as defined in claim 1 wherein the object has a major dimension and a substantially smaller minor dimension at a right angle to the major dimension, including:

(e) transforming the detected moving spherical radar energy to moving cylindrical radar energy about an axis oriented parallel to the major dimension of the object to determine the far field RCS of the object.

3. The method of determining the far field RCS of an object as defined in claim 1 wherein step (d) includes:

(d1) determining a first phasor of the detected moving spherical radar energy, the first phasor having a centered average;

(d2) from the first phasor, determining the centered average of the first phasor;

(d3) using the centered average of the first phasor to determine the detected stationary spherical radar energy; and (d4) subtracting the detected stationary spherical radar energy from the detected moving spherical radar energy and the detected stationary spherical radar energy to determine the RCS of the object.

4. The method of determining the far field RCS of an object as defined in claim 3 wherein steps (a), (b), and (c) are repeated at different wavelengths.

5. The method of determining the far field RCS of an object as defined in claim 3 wherein step (a) is repeated for a plurality of different wavelengths as step (b) is being performed.

6. The method of determining the far field RCS of an object as defined in claim 5 wherein step (d) includes:

(d1) determining first phasors of the detected moving spherical radar energy at different wavelengths, the first phasers having a centered average;

(d2) determining second phasors of moving multipath reflection from variations in the first phasors at different frequencies;

(d3) removing the second phasors from the first phasors;

(d4) determining the centered average of the first phasors;

(d5) using the centered average of the first phasors to determine the detected stationary spherical radar energy; and (d6) subtracting the detected stationary spherical radar energy from the detected moving spherical radar energy and the detected stationary spherical radar energy to determine the RCS of the object.

7. The method of determining the far field RCS of an object as defined in claim 1 wherein step (d) includes:

(d1) determining a first phasor of the detected moving spherical radar energy, the first phasor having spiral variation and a central average;

(d2) determining spiral variation in the first phasor;

(d3) removing the spiral variation from the first phasor;

(d4) determining the centered average of the first phasor;

(d5) using the centered average of the first phasor to determine the detected stationary spherical radar energy; and (d6) subtracting the detected stationary spherical radar energy from the detected stationary and moving spherical radar energy to determine the RCS of the object.

8. The method of determining the far field RCS of an object as defined in claim 7 wherein step (d) further includes:

(d7) determining a second phasor of any moving multipath reflection from non-spiral variations in the first phasor; and (d8) removing the second phasor from the first phasor.

9. The method of determining the far field RCS of an object as defined in claim 8 wherein the second phasor of step (d7) is determined by comparing the detected moving and stationary spherical radar energy at various positions of the object at different wavelengths.

10. The method of determining the far field RCS of an object as defined in claim 7 wherein step (d) further includes:

(d7) determining a second phasor of any moving multipath reflection from non-spiral variations in the first phasor by performing steps (a), (b), and (c) at different wavelengths; and (d8) removing the second phasor from the first phasor.

11. The method of determining the far field RCS of an object as defined in claim 1 wherein step (d) includes:

(d1) determining a first phasor of the detected moving radar energy, the first phaser having spiral variation and a centered average;

(d2) determining any spiral variation in the first phasor;

(d3) removing the spiral variation from the first phasor;

(d4) determining the centered average of the first phasor;

(d5) using the centered average of the first phasor to determine the detected stationary radar energy; and (d6) subtracting the detected stationary radar energy from the detected stationary and moving radar energy to determine the RCS of the object.

12. The method of determining the far field RCS of an object as defined in claim 1 including:

treating the stationary background with radar absorbing material to reduce detected stationary spherical radar energy; and gating out stationary spherical radar energy whose time of return is too long to have come from the object.

13. A facility to measure the RCS of an object including:

a stationary enclosure;

radar antenna means for emitting radar signals positioned in said stationary enclosure having:
a near field; and
a line-of-sight along which radar signals can be emitted in said near field;

object mounting means for positioning the object in said near field of said radar antenna means positioned in said stationary enclosure, said object mounting means including:
translating means for controllably translating the object along said line-of-sight at least a distance that is half the wave length of the radar signals; and a radar system for providing radar signals to said radar antenna and for processing radar signals received thereat, said radar system including:
means to determine Doppler changes in the received radar signals as said translating means are controllably translating the object.

14. The facility to measure the RCS of an object as defined in claim 13 wherein said object mounting means include:

air bearing platforms;

jackstands mounted on said air bearing platforms adapted to engage and support an aircraft with its landing gear retracted as the object to be tested; and a controllable rotator operatively connected to said air bearing platforms for azimuthal rotation of said air bearing platforms.

15. The facility to measure the RCS of an object as defined in claim 13 wherein said object mounting means include:

a controllable rotator adapted for connection to the object;

a pylon treated to minimize radar reflections therefrom, said pylon having:
a bottom connected to said translating means;
a top on which said controllable rotator is mounted;
a first cross-sectional width facing said radar antenna; and
a second cross-sectional width larger than said first cross-sectional width and at a right angle thereto.

16. The facility to measure the RCS of an object as defined in claim 13 wherein said radar antenna means is a simple emitter of spherical radar signals.

17. The facility to measure the RCS of an object as defined in claim 13 wherein said object mounting means include:

a controllable rotator connected to said translating means;

a column constructed from low radar reflecting material, said column having:
    a bottom connected to said controllable rotator; and
    a top adapted for connection to the object.

18. The facility to measure the RCS of an object as defined in claim 13 wherein said radar system further includes:

means to transform the received radar signals, which are near field signals, into far field signals through use of a Spherical Fourier Optics Transform.

19. A device to determine the far field RCS of an object by illuminating the object with near field radar signals including:

a radar having:
    means for transmitting at least at two frequencies;
    an antenna for emitting the at least two frequencies and receiving reflections thereof, said antenna having:
        a near field; and
        a line-of-sight along which radar signals can be emitted in said near field; and object mounting means for positioning the object in said near field of said antenna for impingement by the at least two frequencies, said object mounting means including:
    translating means for controllably translating the object along said line-of-sight; and
    position feedback means to allow correspondence of the position of the object to the reflections received by said antenna while said translating means is translating the object.

* * * * *